US012066100B2

(12) United States Patent
Liu

(10) Patent No.: US 12,066,100 B2
(45) Date of Patent: Aug. 20, 2024

(54) ELECTRICAL CONTROL APPARATUS OF INTERNAL SPEED CHANGE DEVICE OF WHEEL HUB FOR GEAR SWITCHING

(71) Applicant: Jen-Chih Liu, Taipei (TW)

(72) Inventor: Jen-Chih Liu, Taipei (TW)

(73) Assignee: NEW KAILUNG GEAR CO., LTD, Kaohsiung (TW)

( * ) Notice: Subject to any disclaimer, the term of this patent is extended or adjusted under 35 U.S.C. 154(b) by 0 days.

(21) Appl. No.: 18/208,313

(22) Filed: Jun. 12, 2023

(65) Prior Publication Data

US 2024/0175491 A1 May 30, 2024

Related U.S. Application Data

(62) Division of application No. 18/058,746, filed on Nov. 24, 2022.

(51) Int. Cl.
*F16H 61/32* (2006.01)
*B60B 27/00* (2006.01)

(52) U.S. Cl.
CPC ......... *F16H 61/32* (2013.01); *B60B 27/0015* (2013.01)

(58) Field of Classification Search
CPC .............. B60K 37/06; B60K 2370/126; B60K 2370/158; F16H 59/08; F16H 2059/081; F16H 2061/241; F16H 61/24; F16H 61/32; B60B 27/0015
See application file for complete search history.

(56) References Cited

U.S. PATENT DOCUMENTS

| 5,239,244 | A | * | 8/1993 | Teder | B60S 1/0818 318/483 |
| 7,834,865 | B2 | * | 11/2010 | Jannasch | H01H 3/227 340/407.1 |
| 2008/0181794 | A1 | * | 7/2008 | Steinfels | F04B 35/06 417/234 |
| 2019/0203826 | A1 | * | 7/2019 | Jiran | F16H 59/08 |
| 2022/0349468 | A1 | * | 11/2022 | Park | F16H 61/0213 |

FOREIGN PATENT DOCUMENTS

DE 202016005830 U1 * 2/2018 ............. B60K 37/06

OTHER PUBLICATIONS

English Translation of DE202016005830 U1 (Year: 2018).*

* cited by examiner

Primary Examiner — Victor L MacArthur
(74) Attorney, Agent, or Firm — FAN

(57) ABSTRACT

An electrical control apparatus of an internal speed change device of a wheel hub for gear switching has a control base and a lateral cover; a circuit board, a motor and a logic driving ring being assembled in an interior receiving space between the control base and the lateral cover; the circuit board being installed with at least one signal transmission contact joint; the logic driving ring being installed with at least one logic loop and a logic driving ring gear; wherein the circuit board is used to drive the motor so that a motor gear of the motor drives the logic driving ring to rotate; rotation of the logic driving ring drives the at least one logic loop to rotate and be positioned to an object position so as to complete electrically control gear switching.

4 Claims, 7 Drawing Sheets

| SHIFT | 01 | 1-2 | 02 | 2-3 | 03 | 3-4 | 04 |
|-------|----|-----|----|----|----|-----|----|
| A | 1 | 1 | 1 | 0 | 0 | 0 | 1 |
| B | 1 | 1 | 0 | 0 | 1 | 1 | 0 |
| C | 1 | 0 | 0 | 1 | 0 | 1 | 1 |

ELECTRICAL CONTROL APPARATUS OF INTERNAL SPEED CHANGE DEVICE OF WHEEL HUB FOR GEAR SWITCHING

The present invention is a divisional application of U.S. patent application Ser. No. 18/058,746, filed at Nov. 24, 2022, which is invented by and assigned to the applicant of the present invention, and thus the contents of the U.S. patent application Ser. No. 18/058,746 is incorporated into the present invention as a part of the present invention.

FIELD OF THE INVENTION

The present invention is related to speed change devices, and in particular to an electrical control apparatus of an internal speed change device of a wheel hub for gear switching.

BACKGROUND OF THE INVENTION

The prior art bicycle speed change devices are classified as prior exposed speed change devices and novel hidden form internal speed change devices hidden within the hub of the wheels. The way for change speed in the device is classified as manual control and automatic control.

However, the prior art design for switching gears electrically has the defects of complicated structures, too many components, high costs, heavy and large volume. All these lead to the reduction of economic efficiency and thus they are not ideal.

Therefore there is an eager demand for a novel design which has simple structure, less components, low cost, small volume, and light so that they are suitable for industrial utilization and being economic.

SUMMARY OF THE INVENTION

Accordingly, the object of the present invention is to provide an electrical control apparatus of an internal speed change device of a wheel hub for gear switching, wherein the structure of the present invention is compact, low cost, light weight and made of only fewer components, and practical in utilization. The electrical control apparatus of the internal speed change device of the wheel hub for gear switching of present invention can complete the actions of repeated rotation and positioning so as to achieve the object of switching of gears. The present invention is safe in operation, practical in industry use and is economic.

To achieve above object, the present invention provides an electrical control apparatus of an internal speed change device of a wheel hub for gear switching, comprising: a control base and a lateral cover being integrally formed; a circuit board, a motor and a logic driving ring being assembled in an interior receiving space between the control base and the lateral cover; the circuit board being installed with at least one signal transmission contact joint; the motor being installed with a motor gear; the logic driving ring being installed with at least one logic loop; the logic driving ring being installed with a logic driving ring gear engaged to the motor gear; and wherein number of the at least one signal transmission contact joint is equal to that of the logic loop of the logic driving ring; the circuit board is used to receive gear switching signals to drive the motor so that the motor gear of the motor drives the logic driving ring to rotate; rotation of the logic driving ring drives the at least one logic loop to rotate with a rotation angle and be positioned to an object position so as to control a lever of the internal speed change device and complete electrically control gear switching of the internal speed change device.

To achieve above object, the present invention further provides an electrical control apparatus of an internal speed change device of a wheel hub for gear switching, comprising: a control base and a lateral cover being integrally formed; a circuit board, a plurality of motors and a plurality of logic driving rings being assembled in an interior receiving space between the control base and the lateral cover; the circuit board being installed with a plurality of signal transmission contact joints; each of the motors being installed with a motor gear; each of the logic driving rings being installed with at least one logic loop; each of the logic driving rings being installed with a logic driving ring gear engaged to the respective motor gear; and the interior receiving space between the control base and the lateral cover being installed with a plurality of positioning seats; each of the positioning seats being installed with a respective one of the motors and a respective one of logic driving rings; and wherein number of the signal transmission contact joints is equal to that of said logic loop of the logic driving rings; the circuit board is used to receive gear switching signals to drive the motors so that the motor gear drives the logic driving ring to rotate; rotation of the logic driving ring drives the at least one logic loop to rotate with a rotation angle and be positioned to an object position so as to control a lever of the internal speed change device and complete electrically control gear switching of the internal speed change device.

DETAILED DESCRIPTION OF THE INVENTION

Figure 1:
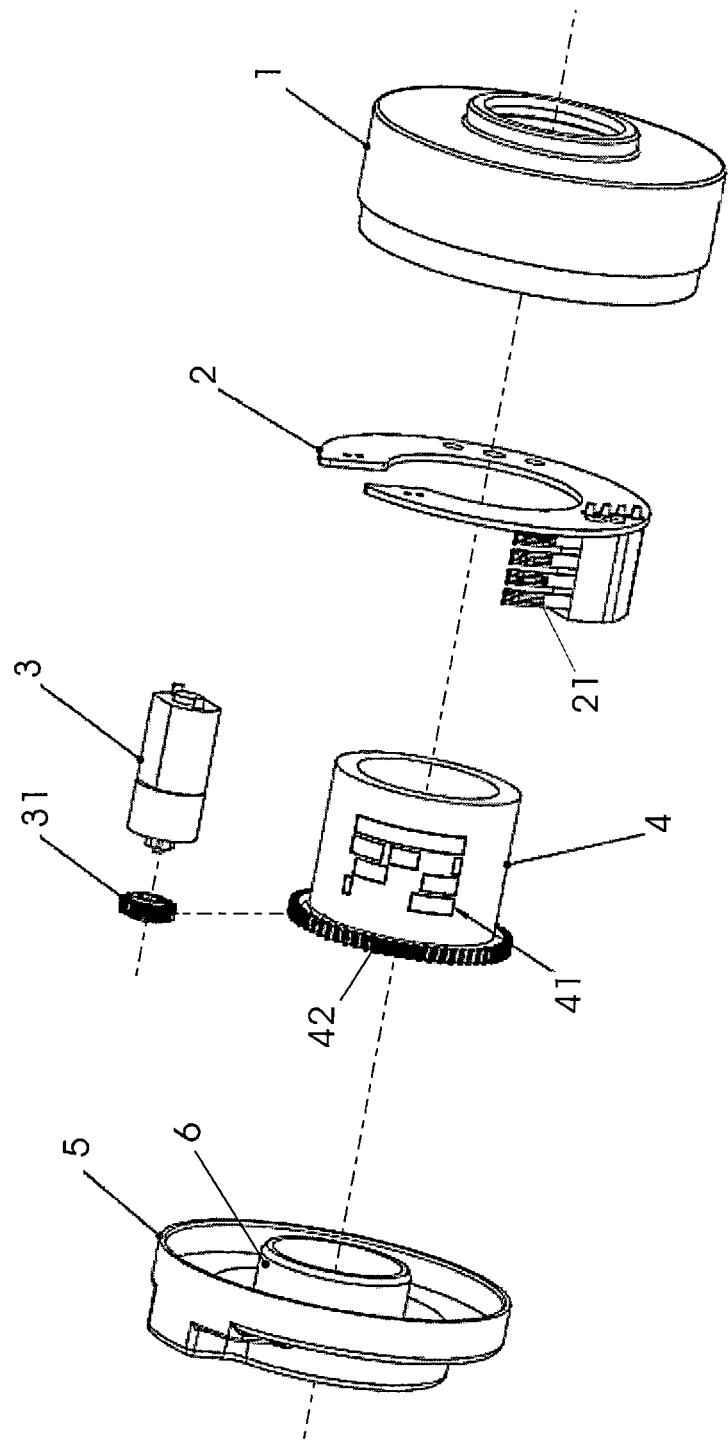
FIG. 1 is an assembled schematic view of the first embodiment of the present invention.
Figure 2:
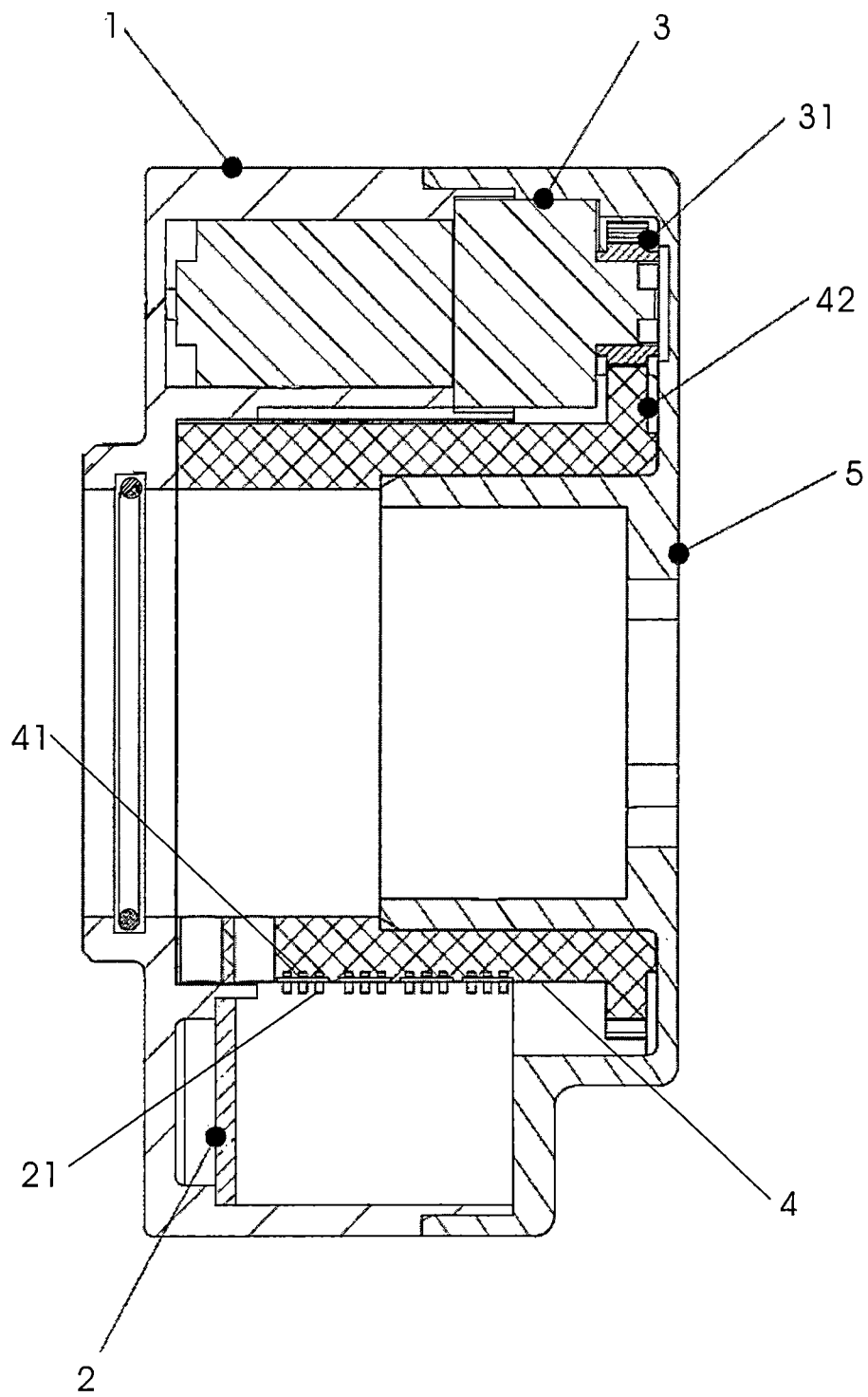
FIG. 2 is a cross sectional view of the first embodiment of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 4, the first embodiment of the present invention is illustrated. Furthermore, referring to FIGS. 5 to 13, the second embodiment of the present invention is illustrated. The first embodiment of the present invention includes the following elements.

A control base 1 and a lateral cover 5 are integrally formed.

A circuit board 2, a motor 3 and a logic driving ring 4 are assembled in an interior receiving space between the control base 1 and the lateral cover 5. The circuit board 2 is installed with at least one signal transmission contact joint 21. The motor 3 is installed with a motor gear 31. The logic driving ring 4 is installed with at least one logic loop 41. The logic driving ring 4 is installed with a logic driving ring gear 42 engaged to the motor gear 31.

Number of the at least one signal transmission contact joint 21 is equal to that of the logic loop 41 of the logic driving ring 4. The circuit board 2 is used to receive gear switching signals to drive the motor 3 so that the motor gear 31 of the motor 3 drives the logic driving ring 4 to rotate. Rotation of the logic driving ring 4 drives the at least one logic loop 41 to rotate with a rotation angle and be positioned to an object position so as to control a lever of the internal speed change device and complete electrically control gear switching of the internal speed change device.

The circuit board 2 receives the gear switching signals by a wired or wireless way. The circuit board 2 is installed with a controller (not shown) for receiving the gear switching signals. The interior receiving space between the control base 1 and the lateral cover 5 is installed with a positioning seat 6. The motor 3 and the logic driving ring 4 are positioned on the positioning seat 6. The at least one signal transmission contact joint 21 is positioned between the circuit board 2 and the logic driving ring 4.

Figures 3, 4:
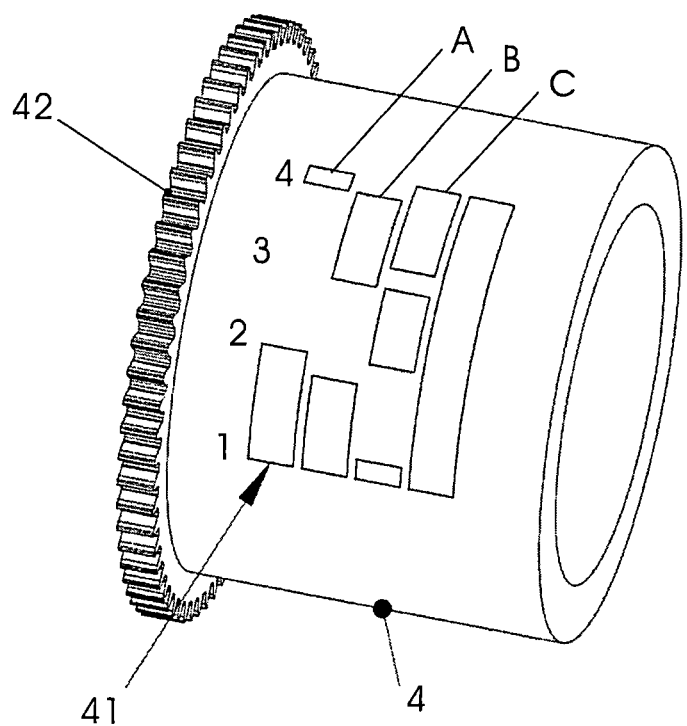
FIG. 3 shows the logic driving ring in the first embodiment of the present invention.
FIG. 4 is a schematic view showing the switching angle control the logic driving ring in the first embodiment of the present invention.

The logic loop 41 of the logic driving ring 4 is used to perform at least two stage controls of electrically control gear switching of the internal speed change device (as illustrated in FIGS. 3 and 4, four stage controls are used as an example). In operation, an inner side of the logic driving ring 4 is used to be connected to a cam structure (not shown) or an electromagnetic structure (not shown), wherein the cam structure is used to directly drive the lever of the internal speed change device and the electromagnetic structure is used to indirectly drive the lever of the internal speed change device. By rotation of the logic driving ring 4, the at least one logic loop 41 rotates to an object position and the cam structure or electromagnetic structure is driven to control the lever of the internal speed change device and complete the electrically control gear switching of the internal speed change device.

With reference to FIGS. 5 to 13, the second embodiment of the present invention is illustrated. In this embodiment, those elements identical to those in the first embodiment are illustrated by the same numerals and they have the same functions and effects.

In the second embodiment, the signal transmission contact joint 21 further includes a left signal elastic finger 21*a*, a right signal elastic finger 21*b*, and a co-polarity elastic sheet 21*c*. The at least one logic loop 41 is on an exterior of the logic driving ring 4; and said logic loop 41 has a non-conductive body 411 made of non-conductive material. When the logic driving ring 4 rotates, the non-conductive body 411 rotates to the left signal elastic finger 21*a* from the right signal elastic finger 21*b* to cause the left signal elastic finger 21*a* to stop as it senses to be in an OFF state so as to complete a speed change operation. As illustrated in the drawing, the logic driving ring 4 rotates through a precise 180 degrees. By alternative operation of the left signal elastic finger 21*a* and the right signal elastic finger 21*b*, the logic driving ring 4 is repetitive rotated with a precise angle and the cam structure or electromagnetic structure is driven to control the lever of the internal speed change device and complete the electrically control gear switching of the internal speed change device.

Figure 5:
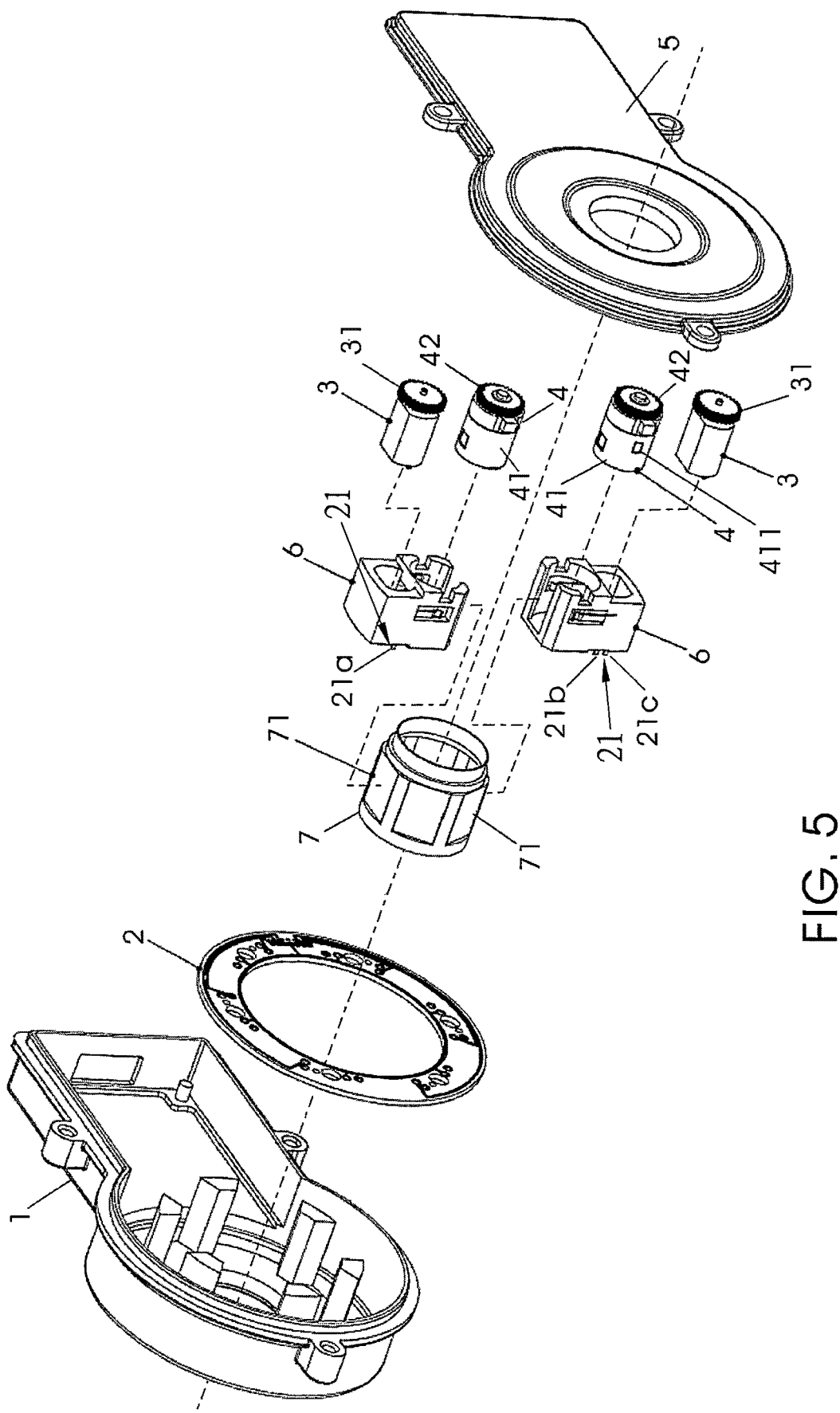
FIG. 5 is an assembled schematic view of the second embodiment of the present invention.
Figure 6:
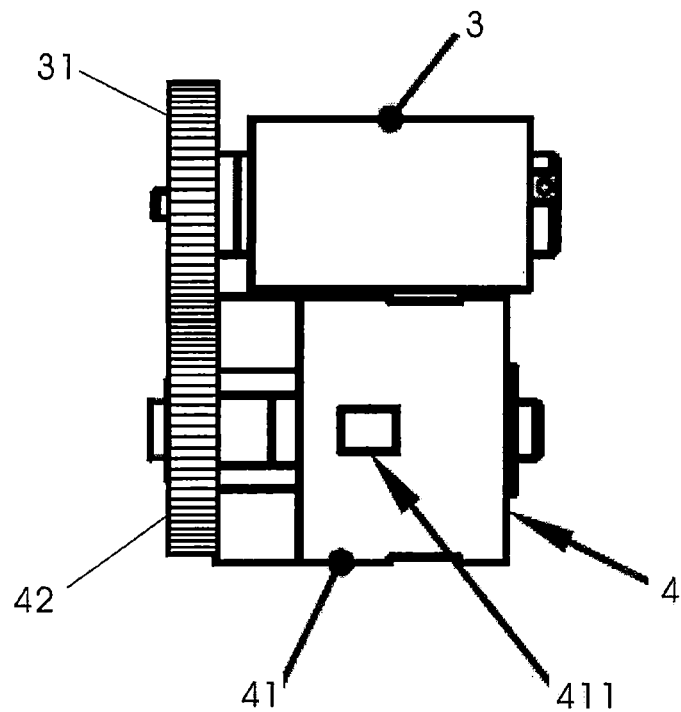
FIG. 6 is a schematic view showing the motor and the logic driving ring in the second embodiment of the present invention.
Figure 7:
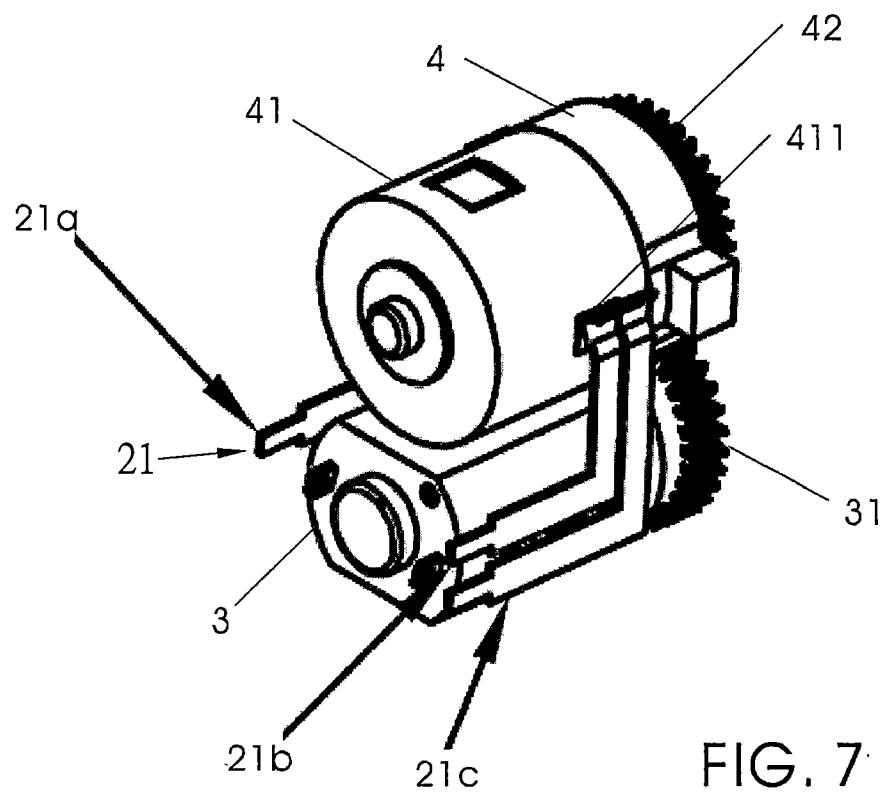
FIG. 7 is a schematic view showing the motor, logic driving ring and the signal transmission contact joint in the second embodiment of the present invention.
Figure 9:
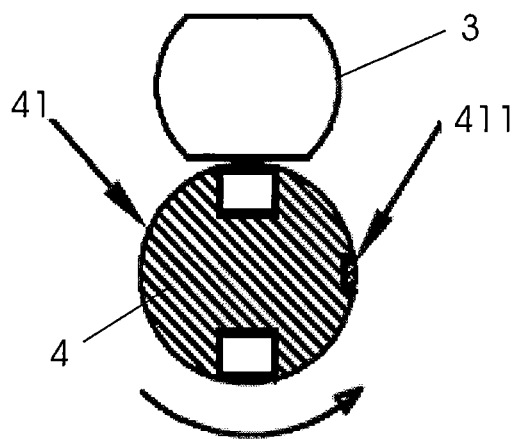
FIG. 9 is a schematic view showing the interaction of the motor and the logic driving ring in the second embodiment of the present invention.
Figure 8:
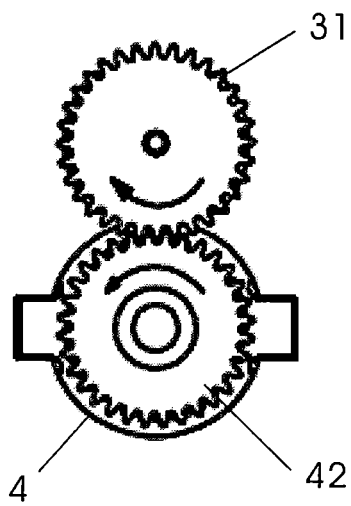
FIG. 8 is a schematic view showing the interaction of the motor and the logic driving ring in the second embodiment of the present invention.
Figure 10:
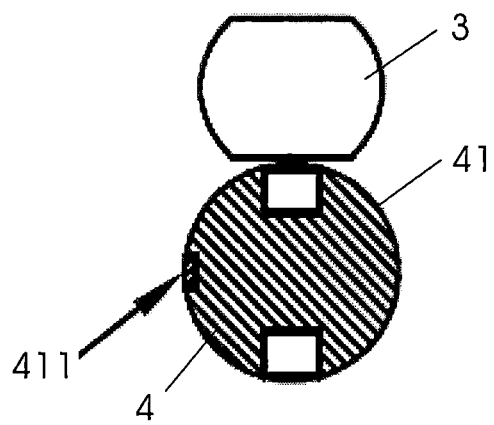
FIG. 10 is a schematic view showing the angle setting in the interaction of the motor and the logic driving ring in the second embodiment of the present invention.
Figure 11:
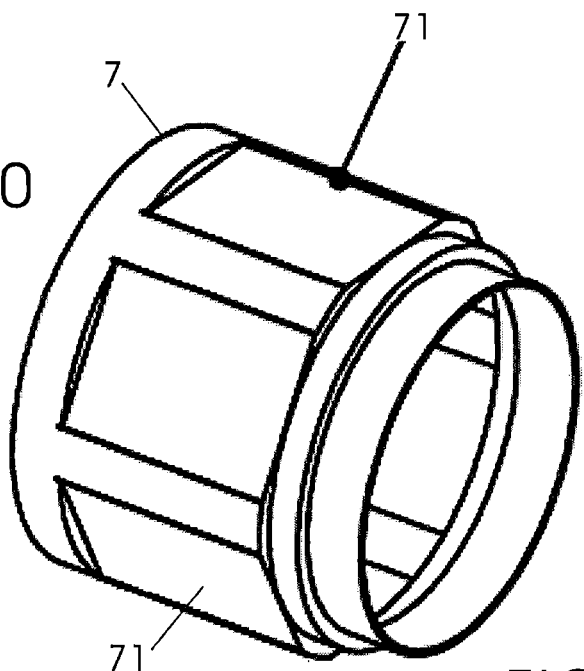
FIG. 11 is a schematic view showing the spacing ring in the second embodiment of the present invention.
Figure 12:
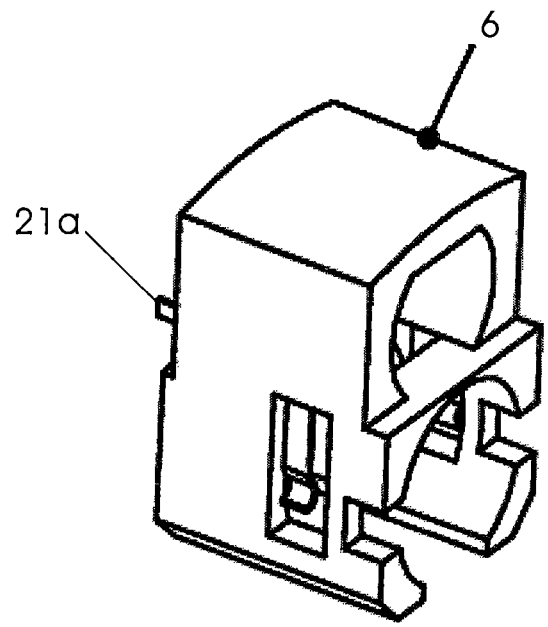
FIG. 12 is a schematic view showing the positioning seat in the second embodiment of the present invention.
Figure 13:
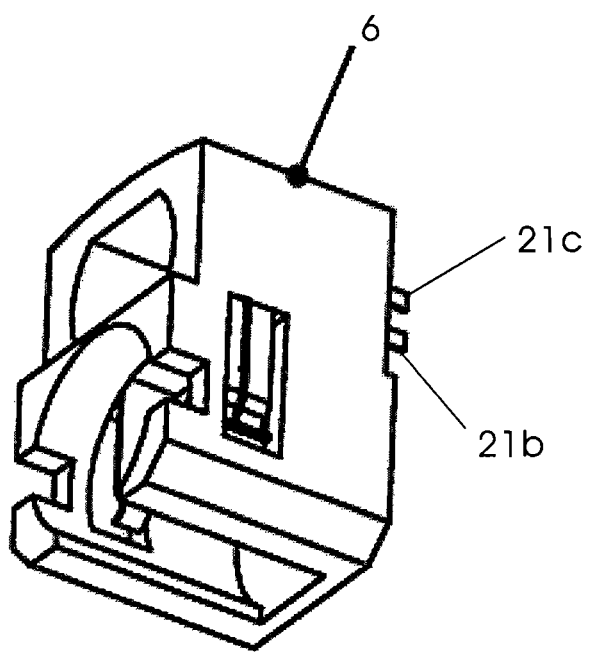
FIG. 13 is a schematic view of the positioning seat in the second embodiment of the present invention, which is viewed from another angle.

With reference to FIGS. 5, there are a plurality of motors 3 and a plurality of logic driving rings 4 assembled in an interior receiving space between the control base 1 and the lateral cover 5. The circuit board 2 is installed with a plurality of signal transmission contact joints 21. Each of the motors 3 is installed with a motor gear 31. Each of the logic driving rings 4 is installed with at least one logic loop 41. Each of the logic driving rings 4 is installed with a logic driving ring gear 42 engaged to the respective motor gear 31. The interior receiving space between the control base 1 and the lateral cover 5 is installed with a plurality of positioning seats 6. Each of the positioning seats 6 is installed with a respective one of the motors 3 and a respective one of logic driving rings 4.

Number of the signal transmission contact joints 21 is equal to that of said logic loop 41 of the logic driving rings 4. The circuit board 2 is used to receive gear switching signals to drive the motors 3 so that the motor gear 31 drives the logic driving ring 4 to rotate. Rotation of the logic driving ring 4 drives the at least one logic loop 41 to rotate with a rotation angle and be positioned to an object position so as to control a lever of the internal speed change device and complete electrically control gear switching of the internal speed change device.

The positioning seats 6 are spaced by a spacing ring 7. The spacing ring 7 is a hollow ring. An exterior of the spacing ring 7 is formed with a plurality of installing surfaces 71. Each of the installing surfaces 71 is installed with a respective one of the positioning seats 6. The circuit board 2 receives the gear switching signals by a wired or wireless way. The circuit board 2 is installed with a controller (not shown for receiving the gear switching signals. The signal transmission contact joints 21 are positioned between the circuit board 2 and the logic driving rings 4; and each of the signal transmission contact joints 21 includes a left signal elastic finger 21*a*, a right signal elastic finger 21*b*, and a co-polarity elastic sheet 21*c*. The at least one logic loop 41 is on an exterior of the logic driving ring 4; and said logic loop 41 has a non-conductive body 411 made of non-conductive material.

In operation, an inner side of the logic driving ring 4 is used to be connected to a cam structure (not shown) or an electromagnetic structure (not shown), wherein the cam structure is used to directly drive the lever of the internal speed change device and the electromagnetic structure is used to indirectly drive the lever of the internal speed change device. By rotation of the logic driving ring 4, the at least one logic loop 41 rotates to an object position and the cam structure or electromagnetic structure is driven to control the lever of the internal speed change device and complete the electrically control gear switching of the internal speed change device.

Advantages of the present invention are that the structure of the present invention is compact, low cost, light weight and made of only fewer components, and practical in utilization. The electrical control apparatus of the internal speed change device of the wheel hub for gear switching of present invention can complete the actions of repeated rotation and positioning so as to achieve the object of switching of gears. The present invention is safe in operation, practical in industry use and is economic.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electrical control apparatus for gear switching, comprising:
    a control base (1) and a lateral cover (5);
    a circuit board (2), a plurality of motors (3) and a plurality of driving rings (4) being assembled in an interior receiving space between the control base (1) and the lateral cover (5); the circuit board (2) having a plurality of signal transmission contact joints (21); each of the motors (3) having a motor gear (31); each of the driving rings (4) having at least one first circuit (41); each of the driving rings (4) having a driving ring gear (42) engaged to the respective motor gear (31); and the interior receiving space between the control base (1) and the lateral cover (5) having a plurality of positioning seats (6); each of the positioning seats (6) having a respective one of the motors (3) and a respective one of the driving rings (4); and
    wherein number of the signal transmission contact joints (21) is equal to that of the driving rings (4); the circuit board (2) is used to receive gear switching signals and to drive the motors (3) so that the motor gear (31) drives the respective driving ring (4) to rotate; rotation of the respective driving ring (4) drives the at least one first circuit (41) to rotate with a rotation angle and be positioned to an object position.

2. The electrical control apparatus for gear switching as claimed in claim 1, wherein the positioning seats (6) are spaced by a spacing ring (7); the spacing ring (7) is a hollow ring; an exterior of the spacing ring (7) is formed with a plurality of installing surfaces (71); each of the installing surfaces (71) is installed with a respective one of the positioning seats 6).

3. The electrical control apparatus for gear switching as claimed in claim 1, wherein the signal transmission contact joints (21) are positioned between the circuit board (2) and the driving rings (4); and each of the signal transmission contact joints (21) includes a left signal elastic finger (21a), a right signal elastic finger (21b), and a co-polarity elastic sheet (21c).

4. The electrical control apparatus for gear switching as claimed in claim 1, wherein the at least one first circuit (41) is on an exterior of the respective driving ring (4).

* * * * *